United States Patent
Praharaj et al.

(10) Patent No.: US 10,273,102 B1
(45) Date of Patent: Apr. 30, 2019

(54) LEADING/TRAILING EDGE DETECTION SYSTEM HAVING PHOSPHORESCENT BELT

(71) Applicant: Xerox Corporation, Norwalk, CT (US)

(72) Inventors: Seemit Praharaj, Webster, NY (US); Paul J. McConville, Webster, NY (US); Douglas K. Herrmann, Webster, NY (US); Jason M. LeFevre, Penfield, NY (US); Chu-heng Liu, Penfield, NY (US); Erwin Ruiz, Rochester, NY (US); Paul M. Fromm, Rochester, NY (US); Linn C. Hoover, Webster, NY (US); David A. VanKouwenberg, Avon, NY (US); Jeffrey J. Bradway, Rochester, NY (US); Martin E. Hoover, Rochester, NY (US); Bruce H. Smith, Webster, NY (US); Donald Thresh, Fairport, NY (US); James D. Van Bortel, Rochester, NY (US); Michael N. Soures, Webster, NY (US); Jonathan R. Ireland, Lancaster, PA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/906,603

(22) Filed: Feb. 27, 2018

(51) Int. Cl.
*B65H 7/14* (2006.01)
*B41J 11/00* (2006.01)
(Continued)

(52) U.S. Cl.
CPC .............. *B65H 7/14* (2013.01); *B41J 11/007* (2013.01); *B41J 11/0095* (2013.01); *B65H 5/004* (2013.01); *B65H 5/021* (2013.01); *B65H 5/224* (2013.01); *G01B 11/043* (2013.01); *G03G 15/6502* (2013.01); *B65H 2404/27* (2013.01); *B65H 2404/28* (2013.01); *B65H 2515/60* (2013.01); *B65H 2553/414* (2013.01); *B65H 2701/1719* (2013.01); *G03G 2215/00616* (2013.01); *G03G 2215/00679* (2013.01); *G03G 2215/00721* (2013.01)

(58) Field of Classification Search
None
See application file for complete search history.

(56) References Cited

U.S. PATENT DOCUMENTS 7,345,300 B2   3/2008   Qin et al.
7,807,275 B2   10/2010  Adamovich et al.
(Continued)

FOREIGN PATENT DOCUMENTS

JP           03132640 A  *  6/1991  ............. G03B 42/02

*Primary Examiner* — Prasad V Gokhale
(74) *Attorney, Agent, or Firm* — Gibb & Riley, LLC

(57) ABSTRACT

Printing devices include a media supply storing print media, a luminescent belt positioned adjacent the media supply in a location to move sheets of the print media from the media supply, a print engine positioned adjacent the luminescent belt in a location to receive the sheets from the luminescent belt, an optical sensor positioned adjacent the belt in a location to receive belt-emitted light from the luminescent belt, and a processor electrically connected to the optical sensor. The processor receives the image from the optical sensor and identifies locations of the sheets on the belt based on where the sheets block the belt-emitted light from the luminescent belt.

20 Claims, 5 Drawing Sheets

(51) Int. Cl.
*G03G 15/00* (2006.01)
*B65H 5/22* (2006.01)
*B65H 5/02* (2006.01)
*G01B 11/04* (2006.01)
*B65H 5/00* (2006.01)

(56) References Cited

U.S. PATENT DOCUMENTS

| | | | |
|---|---|---|---|
| 2006/0093852 A1 | 5/2006 | Marsitzky et al. | |
| 2006/0218883 A1* | 10/2006 | Sperry | B65B 9/02 |
| | | | 53/450 |
| 2006/0268365 A1* | 11/2006 | Thakur | H04N 1/38 |
| | | | 358/474 |
| 2008/0203406 A1 | 8/2008 | He et al. | |
| 2009/0079999 A1* | 3/2009 | Suzuki | B65H 5/021 |
| | | | 358/1.1 |
| 2011/0043830 A1* | 2/2011 | Maeder | B41F 33/0036 |
| | | | 356/615 |
| 2014/0097359 A1* | 4/2014 | Vasic | G01N 21/6408 |
| | | | 250/459.1 |

\* cited by examiner

LEADING/TRAILING EDGE DETECTION SYSTEM HAVING PHOSPHORESCENT BELT

BACKGROUND

Systems herein generally relate to devices that detect the leading/trailing edge of sheets of media, and more particularly to detection systems that have a phosphorescent belt.

Vacuum belts are often used to transport sheets of material, such as sheets of paper, plastic, transparencies, card stock, etc., within printing devices (such as electrostatic printers, inkjet printers, etc.). Such vacuum belts have perforations (which are any form of holes, openings, etc., through the belt), that are open to a vacuum manifold below the belt through which air is drawn. The vacuum manifold draws in air through the perforations, which causes the sheets to remain on the top of the belt, even as the belt moves at relatively high speeds. The belt is generally supported between two or more rollers (one or more of which can be driven) and are commonly used to transport sheets from a storage area (e.g., paper tray) or sheet cutting device (when utilizing webs of material) to a printing engine.

In addition, printers improve performance by detecting locations of the leading and trailing edges of the sheets of media. For example, this allows the printing engine to properly align printing on the sheet of media, and avoids applying marking materials (e.g., inks, toners, etc.) to the belt itself. Common sheet edge detection devices include optical sensors (e.g., laser sensors) or similar devices; however, such optical sensors may not always detect the sheet edges properly, especially when there is little difference between the color, or appearance, of the sheet and the belt because such sensors measure the contrast between the black media transport belt and the white media edge. Problems arise when colored media, such as greys and browns, are used and where the contrast between the media and the belt is not sufficient to properly trigger the sheet edge.

SUMMARY

Various printing devices herein include (among other components) a media supply storing print media, a phosphorescent belt (such as a vacuum belt or an electrostatic belt) positioned adjacent the media supply in a location to move sheets of the print media from the media supply. For example, the phosphorescent belt can include zinc sulfide, strontium aluminate, etc., and can be any form of belt material implanted with phosphorescent materials. In other examples, the luminescent belt can be a fluorescent strip attached to a continuous belt.

Further, a light source is positioned adjacent the phosphorescent belt. In some examples, the light source can be an ultraviolet light source, an infrared light source, a near infrared light source, and a visible light, etc. The light source is in a location to direct a primary light at the phosphorescent belt before the media supply delivers the sheets to the phosphorescent belt. The phosphorescent belt accumulates energy from the primary light and produces belt-emitted light after absorbing the energy from the primary light, and the phosphorescent belt generates this belt-emitted light after the phosphorescent belt moves past the light source. The light source is only periodically activated during continuous operation of the luminescent belt and continuous sensing by the optical sensor.

Such devices also include a print engine positioned adjacent the phosphorescent belt in a location to receive the sheets from the phosphorescent belt, and an optical sensor positioned adjacent the belt in a location to receive belt-emitted light from the phosphorescent belt. The optical sensor is in a different location from the light source such that the light source does not direct the primary light to a location of the phosphorescent belt being observed by the optical sensor.

Also, a processor is electrically connected to the optical sensor. The processor receives the image from the optical sensor and identifies locations of the sheets on the belt based on where the sheets block the belt-emitted light from the phosphorescent belt. These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
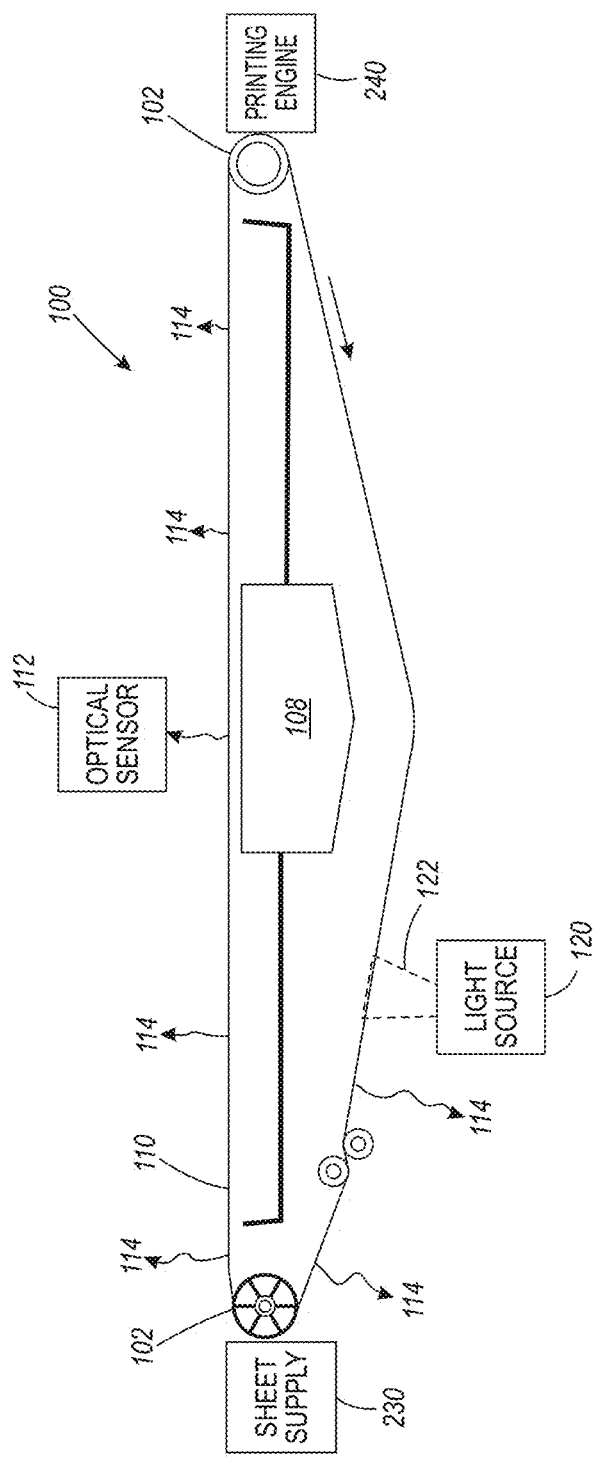
FIGS. 1-3 are side-view schematic diagrams illustrating sheet feeding devices herein.

As mentioned above, optical sensors may not always detect the sheet edges properly. Therefore, the systems and methods herein use a phosphorescent belt in conjunction with a light sensor. The presence or absence of paper on a phosphorescent (glow in the dark) belt results in a strong change in light irradiance (or illuminance), which can be measured by a light sensor to accurately detect the edge of the media.

Phosphorescence is a type of photoluminescence commonly associated with the "glow in the dark" products. Photoluminescence works by slowly re-emitting absorbed radiation at a lower intensity over an extended period of time (typically hours) after the initial excitation. Zinc sulfide and strontium aluminate are the two most commonly used materials to make phosphorescent belts herein, but other similar materials can be used. Since strontium aluminate can be ten times more luminous as compared to zinc sulfide, it makes a more compelling choice for belts herein.

A suitable amount of strontium aluminate, or similar material, can be added to the dispersion used to produce the coating for the belt. This amount as well as the size of the particles is controlled based on the desired light intensity from the belt. A typical paper (20 lb-75 g/m2) over this luminous strip decreases the irradiance of the belt. Media of greater thickness or colored media will obstruct the light to an even greater extent, hence giving an even stronger signal. Therefore, phosphorescent doping of at least the top (outer) layer of the transport belt enables precision lead edge media detection by causing the belt to glow after being exposed to light. This fluorescent doping is monitored by using a photosensitive receiver selected for its reactiveness to the doping materials, to evaluate various doping concentrations.

In other examples, instead of using a phosphorescent belt, a non-phosphorescent belt, with an attached continuous fluorescent ink strip can be utilized. The florescent ink strip can be an infrared (IR) florescent, green florescent, invisible ink florescent, etc. Again, the optical sensor is tuned (with appropriate filers) to detect the appropriate wavelength so as to capture the florescent signal emitted by the continuous fluorescent strip. This allows the optical sensor to detect the difference between the sheets of media on the belt, and the florescent strip (e.g., to detect the positions of the leading or trailing edges of the sheets of media).

Also, while white light can be used to charge the phosphorescent belt/strip, long-wave" ultraviolet" (UV) frequencies, shorter infrared (IR) and near infrared (NIR) light sources (and sensors tuned to detect such frequencies using filters) are also highly useful. Although such specialized frequencies occur in sunlight, the effects are highly visible when exposed to specialized frequency light sources, because the individual components of white light are modified energetically into different wavelengths, producing additional visible light frequencies.

A requirement of the optical sensor that detects the sheet edges can be, for example, a minimum response time (e.g., 60 μs) within a minimum accuracy (e.g., +/−0.05 mm) at a minimum process speed (e.g., 847 mm/sec), etc. The response time for the optical sensor with the phosphorescent vacuum belt/strip is less than half, less than a quarter, etc., of such a minimum response time (e.g., 30-10 μs), with up to a factor of 6× better than desired. Thus, the phosphorescent belt/strip and sensor are uniquely positioned to keep delivering an accuracy of +/−0.05 mm, even when higher minimum process speeds (e.g., 1270 mm/s or higher) are used. In addition to satisfying the technical requirements, these structures also serve the functional requirement of providing high sensitivity, even with small changes in light. Therefore, the phosphorescent belt/strip provides the desired edge detection with the appropriate minimum threshold for the optical sensor to provide a signal.

As noted above, phosphorescent materials work by reemitting absorbed radiation at a lower intensity for several hours. With this, in the absence of an incident light source, the phosphorescent belt/strip would stop emitting light over time. The phosphorescent belt/strip can therefore be exposed to light continuously, or only once every few hours (e.g., 1-6 hours). This is done by activating a light source positioned at the bottom of the marker transport assembly only once every few hours (potentially for only a few seconds) so as to fully charge the belt/strip for continuous use for the next few hours.

Therefore, devices herein can be, for example, a printing apparatus (shown in FIG. 6, and discussed in detail below) that can include, among other components (as shown in FIG. 1) a media supply 230 storing print media, a media path 100 having a phosphorescent belt 110 (potentially a vacuum belt or an electrostatic belt), and if needed a vacuum manifold 108 positioned adjacent (e.g., below) the phosphorescent vacuum belt 110 in a location to draw air through the perforations of the phosphorescent belt 110. As shown in FIG. 1, the vacuum belt 110 is supported between rollers 102, at least one of which is driven, and the phosphorescent vacuum belt 110 is kept under proper tension using tensioning rollers 104.

The generic "media supply" 230 shown in the accompanying drawings can include various elements such as a paper tray, feeder belts, alignment guides, etc., and such devices store or produce cut sheets, and transport the cut sheets of print media to the phosphorescent vacuum belt 110. Also, a print engine 240 is positioned adjacent the vacuum belt 110 in a location to receive sheets from the vacuum belt 110. An optical sensor 112 is positioned adjacent the belt 110 in a location to receive belt-emitted light from the phosphorescent belt 110, and a processor 224 (FIG. 6, discussed below) is electrically connected to the optical sensor 112, etc.

For example, the phosphorescent belt 110 can be made with zinc sulfide, strontium aluminate, or other similar material, etc., and/or the phosphorescent belt 110 can be any form of belt material (e.g., polymers, rubbers, plastics, ceramics, etc.) having at least the outer layer implanted with phosphorescent materials. Other materials can be used, so long as the phosphorescent belt 110 has the ability to emit light for a period of time after being exposed to light source.

Further, as shown in FIG. 1, a light source 120 (e.g., incandescent, light emitting diode (LED), laser, etc.) is positioned adjacent the phosphorescent belt 110. In some examples, the light source 120 can be an ultraviolet (UV) light source 120, an infrared (IR) light source 120, a near infrared (NIR) light source 120, a white or visible light source 120, etc. As shown in FIG. 1, the light source 120 is in a location to direct a primary light 122 at the phosphorescent belt 110 before the media supply delivers the sheets to the phosphorescent belt 110. This allows the phosphorescent belt 110 to accumulate light energy from the primary light before sheets of media are placed on the phosphorescent belt 110, which increases the light difference between the phosphorescent belt 110 and the media sheet.

Wavy lines 114 in FIG. 1 illustrate belt-emitted light, which is light that the phosphorescent belt 110 emits, and is not (is different from) reflected light. In other words, the belt-emitted light is not light being reflected from the phosphorescent belt 110, but instead is a glow that the phosphorescent belt 110 produces. Thus, as the phosphorescent belt 110 moves in the process direction (shown by arrow in FIG. 1), the phosphorescent belt 110 accumulates energy from the primary light 122 and produces belt-emitted light 114 after absorbing the energy from the primary light 122, and the phosphorescent belt 110 generates this belt-emitted light 114 after the phosphorescent belt 110 moves past the light source 120.

The light source 120 can be on continuously, or can be only periodically activated during continuous operation (movement, sheet transport, etc.) of the phosphorescent belt 110 (and corresponding continuous sensing by the optical sensor 112). Note that the wavy lines 114 decrease in size as the belt moves further from the light source 120, and this indicates that the intensity of the belt-emitted light 114 decreases after the phosphorescent belt 110 stops receiving the primary light 122; but as noted above, the phosphorescent belt 110 produces light for hours after being exposed to brief periods of primary light 122 (seconds or minutes; and less than an hour), and the decrease in the wavy lines 114 in the drawings is exaggerated for purposes of illustration. Therefore, the phosphorescent belt 110 can continuously move and perform the sheet transport function, etc., and the optical sensor 112 can perform continuous sensing of the leading and trailing edges of the sheets on the phosphorescent belt 110, all while the light source 120 is off for hours, only relying upon the emission of the belt-emitted light 114 from the stored light energy within the phosphorescent belt 110 (obtained from periodic, short duration (less than 10 min., less than 3 min., less than 1 min., etc., exposure).

FIG. 1 also shows that the optical sensor 112 is in a different location from the light source 120 such that the light source 120 does not direct the primary light 122 to a location of the phosphorescent belt 110 being observed by the optical sensor 112. As shown in FIG. 1, the light source 120 can provide primary light 122 to the outside surface of the phosphorescent belt 110 (the inside of the phosphorescent belt 110 contacts the rollers 102, and the outside surface is on the opposite side of the phosphorescent belt 110 from the inside). The outside surface of the phosphorescent belt 110 is the surface upon which sheets are placed by the sheet supply 230.

Figure 2:
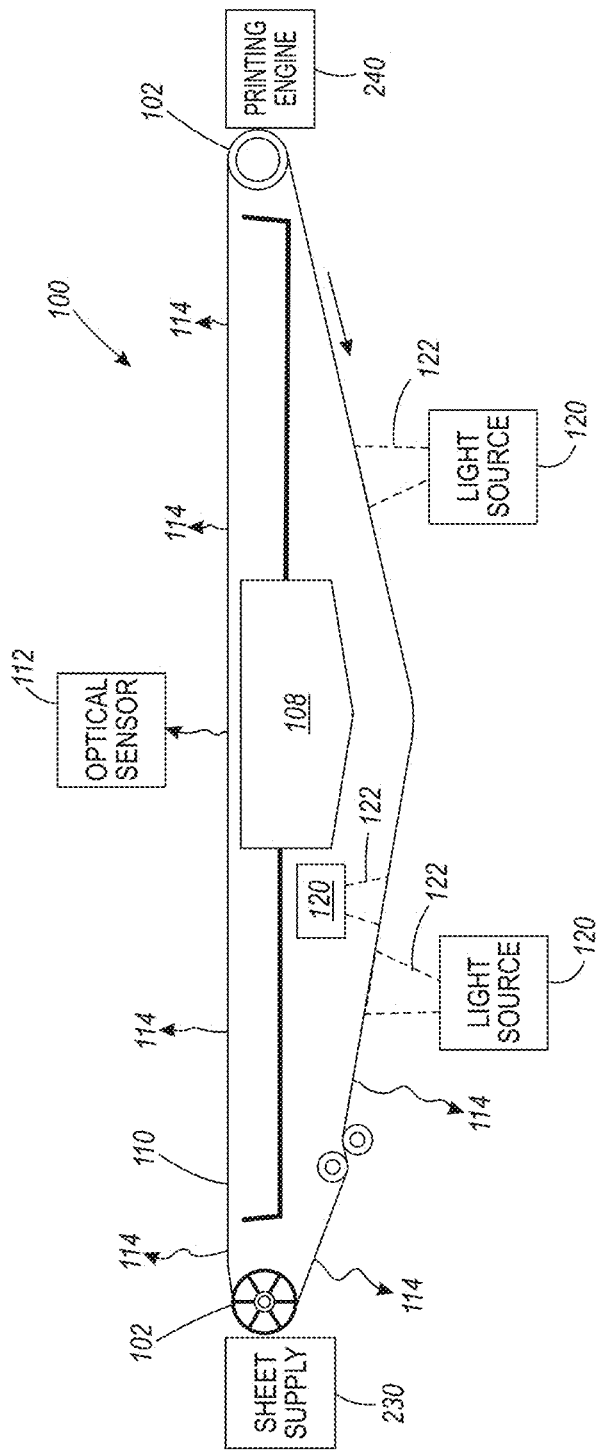

FIG. 2 illustrates that the structures herein can include multiple light sources 120, and such light sources can be directed to the inside surface or the outside surface of the phosphorescent belt 110. The various light sources 120 can all be the same (e.g., all emit only white light, all emit only UV, all emit only IR, all emit only NIR, etc.), or a combination of different types of light sources 120 can be used (e.g., some emit white light, some emit UV, some emit IR, some emit NIR, etc.). The type of light used will vary depending upon the light absorption/emission capabilities of the phosphorescent belt 110. Note that, for structures that include the light source 120 next to the inside surface of the phosphorescent belt 110, most or all of the layers of the phosphorescent belt 110 would be doped with the phosphorescent material(s).

Figure 3:
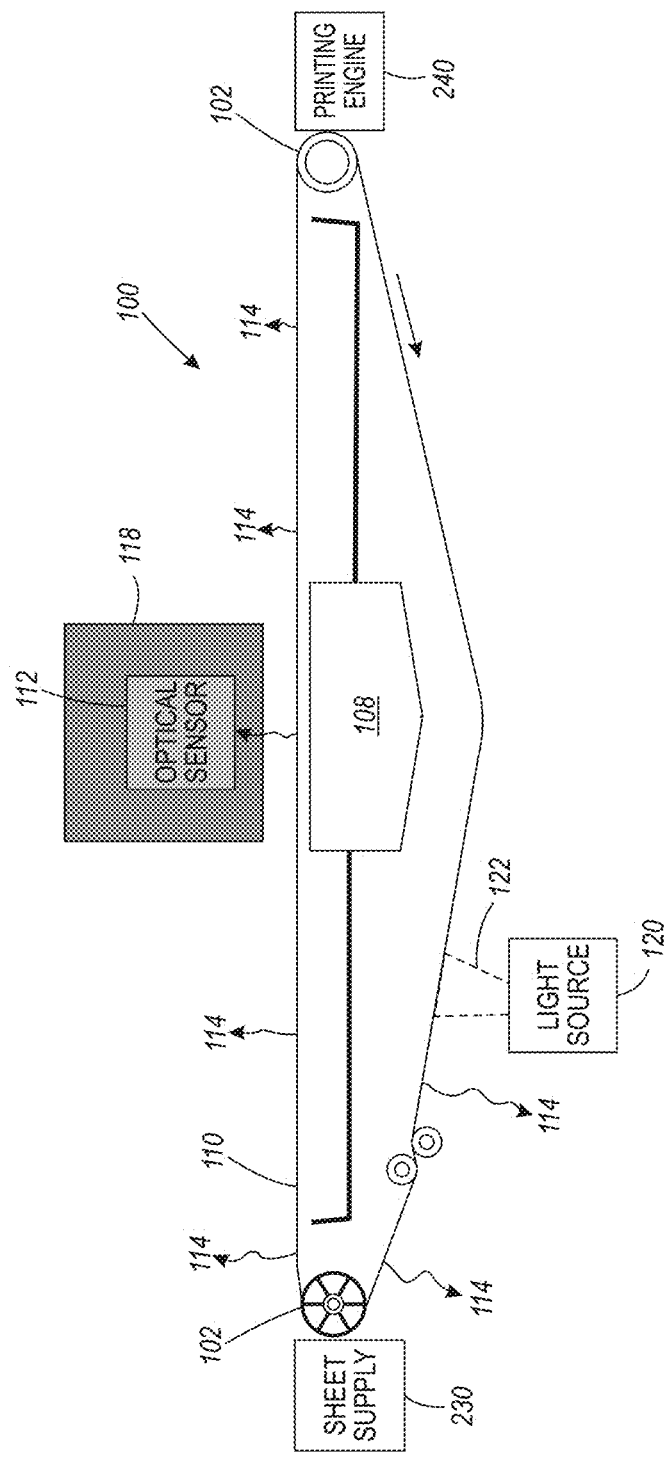

FIG. 3 illustrates that in some implementations, a light shield 118 (shown in partial transparent view in FIG. 3) can be used to create a dark region in the location where the optical sensor 112 detects the leading and trailing edges of the sheets of media. By using a light shield 118, there is less ambient light reflected from the media sheet on the phosphorescent belt 110, increasing the contrast between the media sheet and the glowing phosphorescent belt 110, which allows the leading and trailing edges of the media sheet to be detected more easily.

Figure 4:
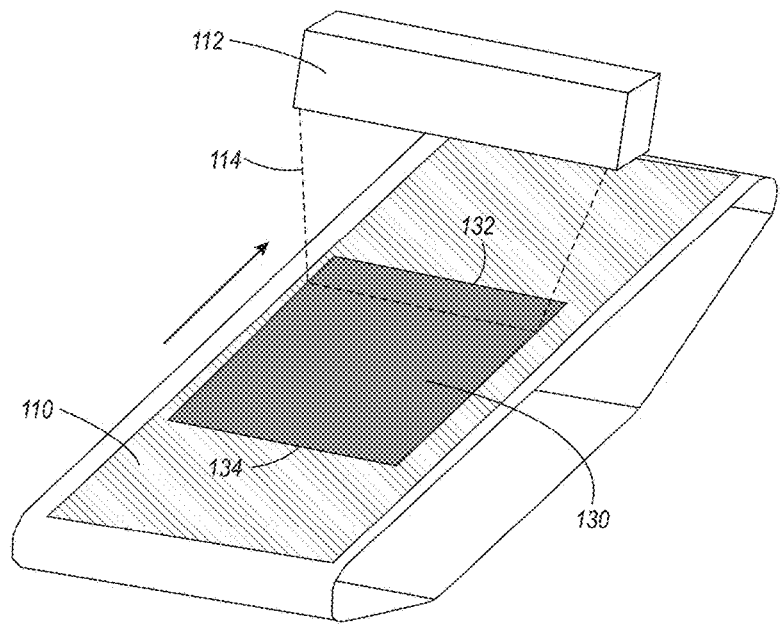
FIGS. 4-5 are perspective-view schematic diagrams illustrating sheet feeding devices herein.

FIG. 4 is a perspective view of the phosphorescent belt 110 with a sheet of media 130 thereon. Additionally, FIG. 4 illustrates the leading edge 132 and trailing edge 134 of the media sheet 130, when the phosphorescent belt 110 moves the media sheet 130 in the processing direction indicated by the arrow in FIG. 4. FIG. 4 also shows the optical sensor 112 detecting the belt-emitted light 114 and thereby identifying the locations of the leading and trailing edges 132, 134 of the sheet 130.

Figure 5:
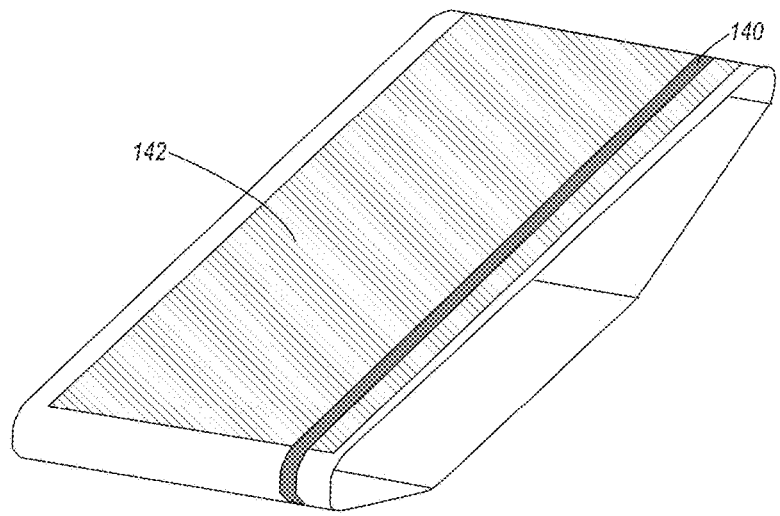

In other examples, as shown in FIG. 5, the phosphorescent belt can be a phosphorescent strip 140 attached to a continuous belt 142. The continuous belt 142 may or may not be phosphorescent, but the phosphorescent strip 140 is formed of the same materials as the phosphorescent belt 110 discussed above. The phosphorescent strip 140 can be attached to the continuous belt 142 using adhesives, mechanical connectors, etc., and therefore can be part of, or bonded to, glued on, sewn on, mechanically attached to, etc., the continuous belt 142.

Figure 6:
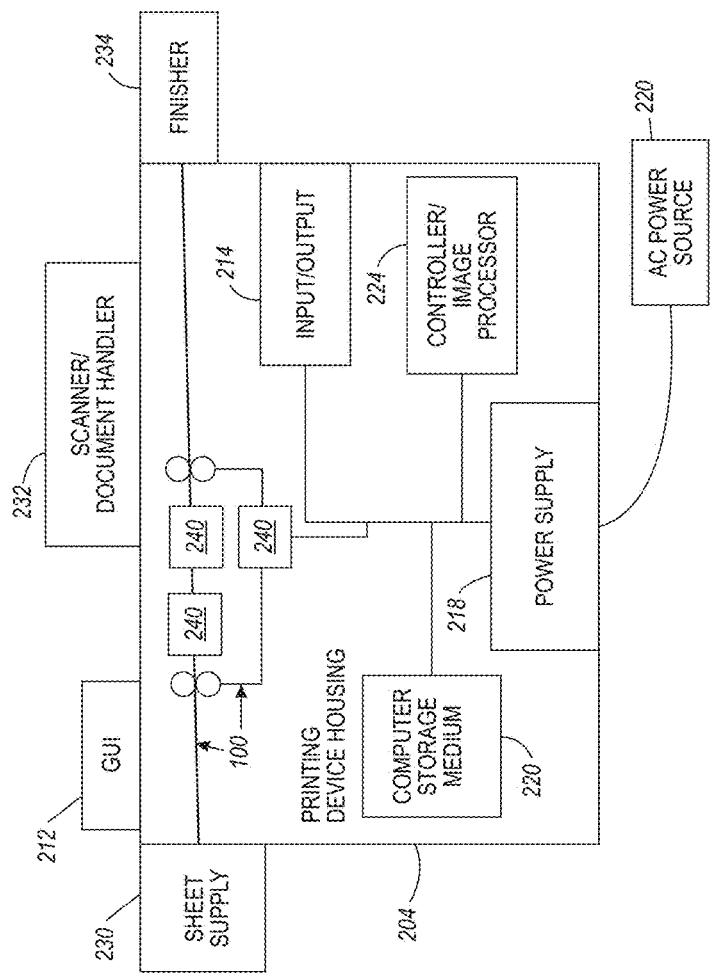
FIG. 6 is a schematic diagram illustrating printing devices herein.

FIG. 6 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. The processor 224 receives the image from the optical sensor 112 and identifies locations of the sheets 130 on the phosphorescent belt 110 based on where the sheets 130 block the belt-emitted light 114 being emitted from the phosphorescent belt 110.

Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the printing device 204.

A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 6, a body housing has one or more functional components that operate on power supplied from an alternating current (AC) source 220 by the power supply 218. The power supply 218 can comprise a common power conversion unit, power storage element (e.g., a battery, etc.), etc.

The printing device 204 includes at least one marking device (printing engine(s)) 240 that use marking material, and are operatively connected to a specialized image processor 224 (that is different from a general-purpose computer because it is specialized for processing image data), a media path 100 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing apparatus comprising:
   a media supply storing print media;
   a luminescent belt positioned adjacent said media supply, wherein said luminescent belt moves in a process direction to move sheets of said print media delivered from said media supply;
   a light source positioned adjacent said luminescent belt in a first location, relative to said process direction movement of said luminescent belt, to direct a primary light at said luminescent belt before said media supply delivers said sheets to said luminescent belt;
   an optical sensor positioned adjacent said luminescent belt in a second location, relative to said process direction movement of said luminescent belt, different from said first location, to receive belt-emitted light from said luminescent belt after said media supply delivers said sheets to said luminescent belt; and
   a processor electrically connected to said optical sensor, wherein said processor receives an image from said optical sensor and identifies positions of said sheets on said luminescent belt based on where said sheets block said belt-emitted light from said luminescent belt.

2. The printing apparatus according to claim 1, wherein said light source is continuously on or is periodically activated during continuous operation of said luminescent belt and continuous sensing by said optical sensor.

3. The printing apparatus according to claim 1, wherein said luminescent belt accumulates energy from said primary light and produces said belt-emitted light after absorbing said energy from said primary light.

4. The printing apparatus according to claim 3, wherein said light source comprises at least one of an ultraviolet light source, an infrared light source, a near infrared light source, and a visible light source.

5. The printing apparatus according to claim 1, wherein said luminescent belt comprises a fluorescent strip attached to a continuous belt.

6. The printing apparatus according to claim 1, wherein said luminescent belt comprises any form of belt material implanted with luminescent materials.

7. The printing apparatus according to claim 1, wherein said luminescent belt comprises a vacuum belt or an electrostatic belt.

8. A printing apparatus comprising:
   a media supply storing print media;
   a phosphorescent belt positioned adjacent said media supply, wherein said phosphorescent belt moves in a process direction to move sheets of said print media delivered from said media supply;
   a light source positioned adjacent said phosphorescent belt in a first location, relative to said process direction movement of said phosphorescent belt, to direct a primary light at said phosphorescent belt before said media supply delivers said sheets to said phosphorescent belt, wherein said phosphorescent belt generates belt-emitted light in response to said primary light;
   a print engine positioned adjacent said phosphorescent belt to receive said sheets from said phosphorescent belt;
   an optical sensor positioned adjacent said phosphorescent belt in a second location, relative to said process direction movement of said phosphorescent belt, different from said first location, to receive belt-emitted light from said phosphorescent belt after said media supply delivers said sheets to said phosphorescent belt; and
   a processor electrically connected to said optical sensor, wherein said processor receives an image from said optical sensor and identifies positions of said sheets on said phosphorescent belt based on where said sheets block said belt-emitted light from said phosphorescent belt.

9. The printing apparatus according to claim 8, wherein said light source is continuously on or is periodically activated during continuous operation of said phosphorescent belt and continuous sensing by said optical sensor.

10. The printing apparatus according to claim 8, wherein said phosphorescent belt accumulates energy from said primary light and produces said belt-emitted light after absorbing said energy from said primary light.

11. The printing apparatus according to claim 8, wherein said light source comprises at least one of an ultraviolet light source, an infrared light source, a near infrared light source, and a visible light source.

12. The printing apparatus according to claim 8, wherein said phosphorescent belt comprises a fluorescent strip attached to a continuous belt.

13. The printing apparatus according to claim 8, wherein said phosphorescent belt comprises any form of belt material implanted with phosphorescent materials.

14. The printing apparatus according to claim 8, wherein said phosphorescent belt comprises a vacuum belt or an electrostatic belt.

15. A printing apparatus comprising:

a media supply storing print media;

a phosphorescent belt positioned adjacent said media supply, wherein said phosphorescent belt moves in a process direction to move sheets of said print media delivered from said media supply;

a light source positioned adjacent said phosphorescent belt in a first location, relative to said process direction movement of said phosphorescent belt, to direct a primary light at said phosphorescent belt before said media supply delivers said sheets to said phosphorescent belt, wherein said phosphorescent belt generates belt-emitted light in response to said primary light after said phosphorescent belt moves past said light source;

a print engine positioned adjacent said phosphorescent belt to receive said sheets from said phosphorescent belt;

an optical sensor positioned adjacent said phosphorescent belt in a second location, relative to said process direction movement of said phosphorescent belt, different from said first location, to receive belt-emitted light from said phosphorescent belt after said media supply delivers said sheets to said phosphorescent belt, wherein said light source does not direct said primary light to said second location of said phosphorescent belt; and a processor electrically connected to said optical sensor, wherein said processor receives an image from said optical sensor and identifies positions of said sheets on said phosphorescent belt based on where said sheets block said belt-emitted light from said phosphorescent belt.

16. The printing apparatus according to claim 15, wherein said light source is continuously on or is periodically activated during continuous operation of said phosphorescent belt and continuous sensing by said optical sensor.

17. The printing apparatus according to claim 15, wherein said phosphorescent belt accumulates energy from said primary light and produces said belt-emitted light after absorbing said energy from said primary light.

18. The printing apparatus according to claim 15, wherein said light source comprises at least one of an ultraviolet light source, an infrared light source, a near infrared light source, and a visible light source.

19. The printing apparatus according to claim 15, wherein said phosphorescent belt comprises a fluorescent strip attached to a continuous belt.

20. The printing apparatus according to claim 15, wherein said phosphorescent belt comprises any form of belt material implanted with phosphorescent materials.

* * * * *